United States Patent [19]

Jotterand

[11] 4,065,447
[45] Dec. 27, 1977

[54] AZO COMPOUNDS HAVING A 3-ARYLTHIO- OR ALIPHATICTHIO-4-CYANO- OR ALKOXYCARBONYL-PYRAZOLYL-5 DIAZO COMPONENT RADICAL

[75] Inventor: Armand Jotterand, Lancy, Switzerland

[73] Assignee: Sandoz Ltd., Basel, Switzerland

[21] Appl. No.: 613,391

[22] Filed: Sept. 15, 1975

[30] Foreign Application Priority Data

Sept. 17, 1974 Switzerland .................... 12629/74

[51] Int. Cl.² .............. C09B 29/06; C09B 29/08; C09B 29/36; C09B 29/38
[52] U.S. Cl. .................... 260/163; 260/156; 260/158; 260/162; 548/356
[58] Field of Search .............. 260/156, 160, 162, 163

[56] References Cited

U.S. PATENT DOCUMENTS

| | | | |
|---|---|---|---|
| 3,356,673 | 12/1967 | Favre et al. | 260/163 |
| 3,515,715 | 6/1970 | Straley et al. | 260/163 |
| 3,634,391 | 1/1972 | Fisher et al. | 260/162 |
| 3,663,528 | 5/1972 | Ramanathan | 260/156 |
| 3,786,040 | 1/1974 | Mislin et al. | 260/162 |

FOREIGN PATENT DOCUMENTS

| | | | |
|---|---|---|---|
| 1,305,607 | 8/1962 | France | 260/162 |
| 1,408,672 | 10/1975 | United Kingdom | 260/163 |

Primary Examiner—Floyd D. Higel
Attorney, Agent, or Firm—Gerald D. Sharkin; Richard E. Vila; Melvyn M. Kassenoff

[57] ABSTRACT

Disclosed are azo dyes of the formula

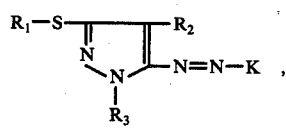

wherein
$R_1$ is an aliphatic or aryl group,
$R_2$ is cyano, alkoxycarbonyl or substituted alkoxycarbonyl,
$R_3$ is an aliphatic or aryl group, and
K is a coupling component radical, the synthesis thereof and the use thereof for the dyeing and printing of textile and non-textile substrates. The disclosed disperse dyes are useful for dyeing and printing synthetic and semi-synthetic, hydrophobic, high molecular weight materials such as linear aromatic polyesters, polyamides, cellulose 2½ acetate and cellulose triacetate. The obtained dyeings have satisfactory fastness properties, particularly fastness to light, thermofixation, sublimation and pleating.

14 Claims, No Drawings

AZO COMPOUNDS HAVING A 3-ARYLTHIO- OR ALIPHATICTHIO-4-CYANO- OR ALKOXYCARBONYL-PYRAZOLYL-5 DIAZO COMPONENT RADICAL

The invention relates to azo compounds.

The invention provides azo dyestuffs having, as radical derived from a diazo component, a radical of formula I,

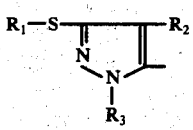

in which
  $R_1$ and $R_3$, independently, are aromatic or aliphatic residues, and
  $R_2$ is cyano or an alkoxycarbonyl radical.

As will be apppreciated, the invention is based on the discovery of azo dyestuffs having the novel radical of formula I as the radical derived from a diazo component. Such dyestuffs may belong to the well recognized classes of dyestuffs, depending on substituents borne by the radical of formula I or by the coupling component in the dye molecule. Conversely, the radical of formula I may bear as the aromatic or aliphatic residues as $R_1$ and $R_3$ and as substituents on the alkoxycarbonyl radical as $R_2$ such residues and substituents as are common in the azo dye art, having regard to the ultimate utility to which the dyestuff is intended to be put or the class of dyestuff desired. Of particular interest are disperse dyes bearing the radical of formula I. Particularly for this class of dyestuff, any aliphatic residue as $R_1$ and $R_3$ is, preferably, an unsubstituted alkenyl radical of 2 to 4 carbon atoms, such as the allyl radical, or, more particularly, an alkyl radical, preferably of 1 to 4 carbon atoms, unsubstituted or substituted by a substituent selected from hydroxy, cyano, $C_{1-4}$alkoxy, phenyl, phenoxy, chlorine or bromine, any aromatic residue as $R_1$ or $R_3$ being, preferably, phenyl, unsubstituted or substituted by up to a total of three substituents selected from chlorine, bromine and methyl (up to three thereof), methoxy, ethoxy, cyano and nitro (up to two thereof) and methoxycarbonyl, ethoxycarbonyl, aminosulphonyl and mono- or di-$C_{1-4}$alkylaminosulphonyl (up to one thereof) and any alkoxycarbonyl radical as $R_2$ being, preferably, unsubstituted and having from 1 to 4 carbon atoms in the alkoxy moiety.

The compounds provided by the invention can be represented by the formula

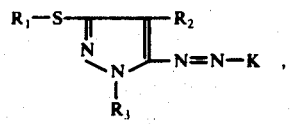

where
  $R_1$ to $R_3$ are as defined above, and
  K is the radical of a coupling component.

Preferred radicals of formula I, particularly for disperse dyes, are the radicals of formula I',

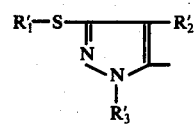

in which
  $R_1'$ is $C_{1-4}$alkyl or phenyl; preferably methyl, ethyl or phenyl; most preferably methyl,
  $R_2'$ is cyano or ($C_{1-4}$aloxy) carbonyl preferably cyano, methoxycarbonyl or ethoxycarbonyl; most preferably cyano, and
  $R_3'$ is methyl, unsubstituted phenyl or phenyl substituted by up to two substituents selected from chlorine, bromine, methyl and methoxy; preferably methyl or phenyl; most preferably phenyl.

As regards coupling components for monoazo dyestuffs, and particularly for disperse dyestuffs, such may be any common in the art, for example, N-alkyl- and N,N-dialkyl-aminobenzene, α-(N-alkyl)- or α-(N,N-dialkyl)-aminonaphthalene, pyrazolone, 5-aminopyrazole and 3-cyano-4-alkyl-6-hydroxypyridone-2 derivatives, in which the alkyl radicals are preferably of 1 to 4 carbon atoms. The preferred coupling component radicals are 4-N-β-$C_{1-4}$alkoxycarbonylethylaminonaphthyl-1, 1-$C_{1-4}$alkyl-3-cyano-4-methyl-6-hydroxypyridone-2-yl-5, 1-phenyl-3-methylpryazolon-5-yl-4 and 1-phenyl-3-methyl-5-aminopyrazolyl-4 radicals and radicals of formula II,

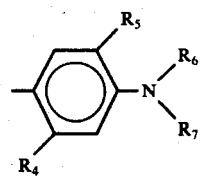

in which
  $R_4$ is hydrogen, chlorine, bromine, cyano, $C_{1-2}$-alkyl, formylamino, an unsubstituted $C_{1-4}$alkylcarbonylamino, $C_{1-4}$alkoxycarbonylamino, β-$C_{1-4}$alkoxyethoxycarbonylamino or $C_{1-4}$alkylsulphonylamino radical, or one of such latter four radicals substituted in the terminal alkyl moiety by a substituent selected from chlorine, bromine, cyano, $C_{1-4}$-alkoxy, phenyl and phenoxy; $R_4$ preferably being acetylamion, propionylamino, methoxycarbonylamino, ethoxycarbonylamino, β-methoxyethoxycarbonylamino or β-ethoxy-ethoxycarbonylamino
  $R_5$ is hydrogen of $C_{1-4}$alkoxy, preferably hydrogen or ethoxy,
  either $R_6$ is $C_{2-4}$alkenyl; 4-nitrophenyl; unsubstituted $C_{1-4}$alkyl; $C_{1-4}$alkyl monosubstituted by chlorine, bromine, cyano, hydroxy, $C_{1-4}$alkoxy, $C_{1-4}$alkoxycarbonyl, β-$C_{1-4}$-alkoxyethoxycarbonyl, $C_{1-4}$alkoxycarbonyloxy or $C_{1-4}$alkylcarbonyloxy; or $C_{1-4}$alkyl disubstituted, once by hydroxy and once by one of the aforesaid substituents;
  $R_6$ preferably being ethyl, unsubstituted or substituted by cyano, hydroxy, methoxy, ethoxy, acetoxy, propionyloxy, methoxycarbonyl or ethoxycarbonyl,
  and $R_7$ has one of the significances of $R_6$, hydrogen, phenyl-($C_{1-4}$)alkyl, a group of formula (a) to (d)

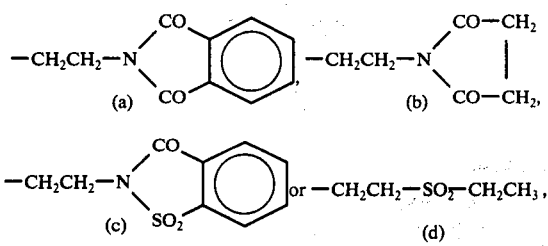

preferably ethyl, unsubstituted or substituted by cyano, hydroxy, methoxy, ethoxy, acetoxy, propionyloxy, methoxycarbonyl or ethoxy-carbonyl, or $R_6$ and $R_7$, together, form a group of formula (e)

$$-CH_2CH_2SO_2CH_2CH_2-, \qquad (e)$$

with the provisos that, in the radical of formula II, (i) any alkyl radical or moiety substituted by hydroxy, alkoxy, alkoxycarbonyloxy phenoxy or alkylcarbonyloxy, is of at least two carbon atoms, the substituent not being in α-position, and (ii) $R_6$ and $R_7$ do not simultaneously signify 4-nitrophenyl radicals or tertiary butyl radicals.

Thus, the preferred compounds of this application are the compounds of Formula Ia wherein each of $R_1$ and $R_3$ is independently $C_{2-4}$alkenyl; $C_{1-4}$alkyl; $C_{1-4}$alkyl monosubstituted by hydroxy, cyano, $C_{1-4}$alkoxy, phenyl, phenoxy, chloro or bromo; phenyl or substituted phenyl having 1 to 3 substituents each of which is independently chloro, bromo, methyl, methoxy, ethoxy, cyano, nitro, methoxycarbonyl, ethoxycarbonyl, sulfamoyl, $C_{1-4}$alkylsulfamoyl or di-($C_{1-4}$alkyl)sulfamoyl, with the proviso that the maximum number of substituents selected from the group consisting of methoxy, ethoxy, cyano and nitro is two and the maximum number of substituents selected from the group consisting of methoxycarbonyl, ethoxycarbonyl, sulfamoyl, $C_{1-4}$alkylsulfamoyl and di-($C_{1-4}$alkyl)sulfamoyl is one, $R_2$ is cyano or ($C_{1-4}$alkoxy)carbonyl, and K is 4-N-β-($C_{1-4}$alkoxy)carbonylethylaminonaphthyl-1,1-$C_{1-4}$alkyl-3-cyano-4-methyl-6-hydroxypyridon-2-yl-5, 1-phenyl-3-methylpyrazolon-5-yl-4, 1-phenyl-3-methyl-5-aminopyrazolyl-4 or

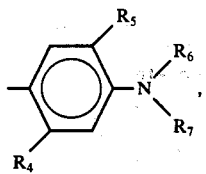

wherein $R_4$ is hydrogen; chloro; bromo; cyano; $C_{1-2}$alkyl; formamido; ($C_{1-4}$alkyl)carbonylamino; ($C_{1-4}$alkyl)carbonylamino the $C_{1-4}$alkyl radical of which is monosubstituted by chloro, bromo, cyano, $C_{1-4}$alkoxy, phenyl or phenoxy; ($C_{1-4}$-alkoxy)carbonylamino; ($C_{1-4}$alkoxy)carbonylamino the $C_{1-4}$alkoxy radical of which is monosubstituted by chloro, bromo, cyano, $C_{1-4}$alkoxy, phenyl or phenoxy; β-($C_{1-4}$alkoxy)ethoxycarbonylamino; β-($C_{1-4}$alkoxy)ethoxycarbonylamino the $C_{1-4}$alkoxy moiety of which is monosubstituted by chloro, bromo, cyano, $C_{1-4}$alkoxy, phenyl or phenoxy; $C_{1-4}$alkylsulfonylamino or $C_{1-4}$alkylsulfonylamino the $C_{1-4}$alkyl radical of which is monosubstituted by chloro, bromo, cyano, $C_{1-4}$alkoxy, phenyl or phenoxy, $R_5$ is hydrogen or $C_{1-4}$alkoxy, $R_6$ is $C_{2-4}$alkenyl; 4-nitrophenyl; $C_{1-4}$-alkyl or substituted $C_{1-4}$alkyl having 1 or 2 substituents each of which is independently chloro, bromo, cyano, hydroxy, $C_{1-4}$alkoxy, ($C_{1-4}$alkoxy)carbonyl, β-($C_{1-4}$alkoxy)ethoxycarbonyl, ($C_{1-4}$alkoxy)carbonyloxy or ($C_{1-4}$alkyl)carbonyloxy, with the proviso that when $R_6$ is disubstituted $C_{1-4}$alkyl, at least one of the substituents is hydroxy, $R_7$ is hydrogen; phenyl($C_{1-4}$alkyl); $C_{2-4}$-alkenyl; 4-nitrophenyl; $C_{1-4}$alkyl; substituted $C_{1-4}$alkyl having 1 or 2 substituents each of which is independently chloro, bromo, cyano, hydroxy, $C_{1-4}$-alkoxy, ($C_{1-4}$alkoxy)carbonyl, β-($C_{1-4}$-alkoxy)ethoxycarbonyl, ($C_{1-4}$alkoxy)carbonyloxy or ($C_{1-4}$alkyl)carbonyloxy, with the proviso that when $R_7$ is disubstituted $C_{1-4}$alkyl, at least one of the substituents is hydroxy;

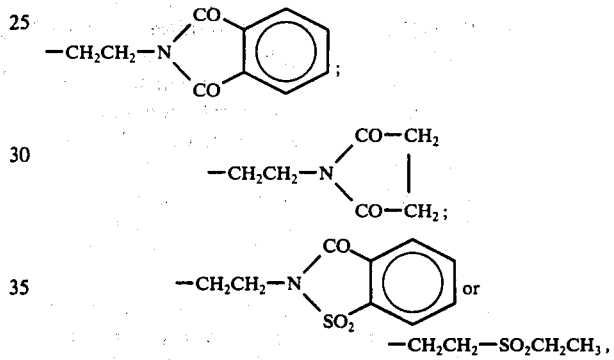

with the proviso that $R_6$ and $R_7$ are not simultaneously 4-nitrophenyl or t-butyl, or $R_6$ and $R_7$ taken together are $-CH_2CH_2SO_2CH_2CH_2-$, with the proviso that any alkyl or alkoxy radical substituted by hydroxy, alkoxy, alkoxycarbonyloxy, phenoxy or alkylcarbonyloxy has more than one carbon atom and is not substituted in its β-position.

The preferred compounds of this group are those wherein the diazo component radical is a radical of Formula I'.

More preferred are the compounds of Formula Ia wherein $R_1$ is methyl, ethyl or phenyl, $R_2$ is cyano, methoxycarbonyl or ethoxycarbonyl, $R_3$ is methyl or phenyl, and

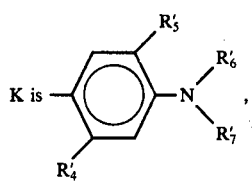

wherein $R_4'$ is acetamido, propionamido, methoxycarbonylamino, ethoxycarbonylamino, β-methoxyethoxycarbonylamino or β-ethoxyethoxycarbonylamino, $R_5'$ is hydrogen or ethoxy, and each of $R_6'$ and $R_7'$ is independently ethyl or ethyl monosubstituted by cyano, hydroxy, methoxy, ethoxy, acetoxy, propionyloxy, methoxycarbonyl or ethoxycarbonyl.

The invention also provides a process for the production of azo dyes having, as radical derived from a diazo component, a radical of formula I, stated above, which process comprises coupling, with an appropriate coupling component, a diazo derivative of an amine of formula III,

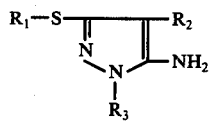

in which $R_1$ to $R_d$ are as defined above.

The above process may be carried out in conventional manner.

The amines of formula III are either known, e.g. from Chem. Ber. 95 2881 et. seq. (1962), or may be produced in manner analogous thereto from available starting materials.

Depending on the classes to which the azo dyes according to the invention belong, they may be employed for the dyeing or printing of a wide variety of textile and non-textile substrates, the classes to which particular dyestuffs belong, the substrates dyeable therewith and the methods of dyeing being within the skill of the man in the art.

The disperse dyes provided by the invention may be employed to dye substrates conventionally dyeable using disperse dyes, i.e. of fully or semi-synthetic hydrophobic, high-molecular weight materials, e.g. textile substrates comprising or consisting of linear, aromatic polyester, of cellulose 2½ acetate, cellulose triacetate or of synthetic polyamide. Such substrates may be dyed in conventional manner, e.g. by the method described in French Pat. No. 1,445,371. The dyeings obtained, particularly with the preferred compounds, have satisfactory overall fastness properties, particularly to light, thermofixation, sublimation and pleating. Other fastness properties may also be mentioned, e.g. wet fastness (water, washing and perspiration), fastness to solvents (dry-cleaning solvents), lubricants, rubbing, cross-dyeing, ozone, flue gases and chlorine. They show a resistance to permanent press processes and soil-release finishing. The dyes show good dischargeability, resistance to reduction (when dyeing wool containing substrates) and they reserve wool and cotton.

Prior to using the disperse dyes for dyeing, they are conveniently converted into dyeing preparations employing conventional techniques such as grinding in the presence of dispersing agents and/or fillers, followed by vacuum or spray drying.

The following Examples, in which the temperatures are in degrees centigrade and the parts are in parts by weight, illustrate the invention.

EXAMPLE 1

11.5 Parts of 1-phenyl-3-methylmercapto-4-cyano-5-aminopyrazole are slowly added at 0°, with stirring, to a mixture consisting of 200 parts water and 160 parts concentrated sulphuric acid. The whole is stirred for half an hour, 4 parts sodium nitrite are added, stirring is then continued for a further 3 hours at 0°, the excess sodium nitrite is broken down with a little amidosulphonic acid and the mixture is filtered.

A solution is prepared from 30 parts 1-acetylamino-3-(N-β—cyanoethyl-N—β-acetoxyethyl)-aminobenzene and 100 parts glacial acetic acid, cooled to 0° and the diazonium solution which has also been cooled to 0° is added slowly with stirring.

The red dye of the formula

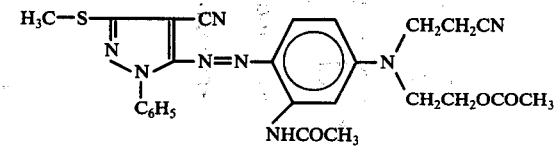

which forms is briefly stirred, then filtered, washed with water until free from acid and dried.

It dyes polyester fibre material in brilliant red shades and the dyeings have notable fastness properties.

The following table gives other dyes of formula V

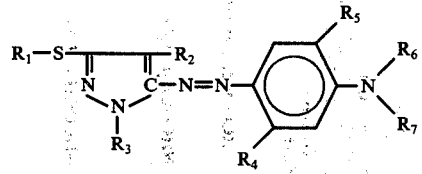

which can be produced in analogous manner.

Also given is the shade which these dyes produce on polyester fibre material.

TABLE

| Ex. No. | $R_1$ | $R_2$ | $R_3$ | $R_4$ | $R_5$ | $R_6$ | $R_7$ | Shade on polyester fibre material |
|---|---|---|---|---|---|---|---|---|
| 2 | —$C_2H_5$ | —CN | —$CH_3$ | —NHCOCH$_3$ | —OC$_2$H$_5$ | —CH$_2$CH$_2$OCOCH$_3$ | —CH$_2$CH$_2$OCOCH$_3$ | violet |
| 3 | —CH$_3$ | —COOCH$_3$ | —C$_6$H$_5$ | " | H | —C$_2$H$_5$ | —C$_2$H$_5$ | red |
| 4 | " | —CN | " | —NHSO$_2$CH$_3$ | H | " | " | " |
| 5 | " | —COOC$_2$H$_5$ | " | —NHCOOCH$_2$CH$_2$OCH$_3$ | H | —CH$_2$CH$_2$CN | —CH$_2$CH$_2$CN | scarlet |
| 6 | —C$_6$H$_5$ | —COOC$_4$H$_9$ | " | H | H | —CH$_2$CH$_2$OCOCH$_3$ | —CH$_2$CH$_2$OCOCH$_3$ | red |
| 7 | —CH$_3$ | —COOC$_3$H$_7$ | " | —NHCHO | H | —CH$_2$—CH=CH$_2$ | —CH$_2$—CH=CH$_2$ | scarlet |
| 8 | " | —CN | " | —CH$_3$ | H | —C$_3$H$_7$ | —C$_3$H$_7$ | scarlet |
|  |  |  |  |  |  | —C$_4$H$_9$ | —C$_4$H$_9$ |  |
| 9 | " | " | 4-Cl-C$_6$H$_4$ | —NHCOOCH$_2$CH$_2$OC$_2$H$_5$ | H | —CH$_2$COOC$_2$H$_5$ | —CH$_2$CH$_2$CN | red |
| 10 | " | " | 4-Br-C$_6$H$_4$ | —NHCOCH$_2$Cl | H | —CH$_2$OCOCH$_3$ | | " |
| 11 | " | " | 2,4-Cl$_2$-C$_6$H$_3$ | —NHCOCH$_2$Br | H | " | | " |
| 12 | " | " | 3-CH$_3$-C$_6$H$_4$ | —NHCOCH$_2$CN | H | —C$_2$H$_5$ | —C$_2$H$_5$ | " |
| 13 | " | " | 4-OCH$_3$-C$_6$H$_4$ | —NHCOCH$_2$C$_6$H$_5$ | —OCH$_3$ | —CH$_2$CH$_2$OH | —CH$_2$CH$_2$OH | red |
| 14 | —CH$_3$ | —COOCH$_3$ | —C$_6$H$_5$ | Cl | H | —CH$_2$CH$_2$OCOC$_2$H$_5$ | —CH$_2$CH$_2$OCOC$_2$H$_5$ | scarlet |
| 15 | " | —CN | " | Br | H | —CH$_2$CH$_2$COOCH$_3$ | —CH$_2$CH$_2$COOCH$_3$ | " |
| 16 | " | " | 3,4-(OCH$_3$)$_2$-C$_6$H$_3$ | —CN | H | —CH$_2$CH$_2$COOC$_4$H$_9$ | —CH$_2$CH$_2$COOC$_4$H$_9$ | scarlet |
| 17 | " | " | " | —NHCOC$_3$H$_7$ | H | —CH$_2$CHOHCH$_2$OH | —CH$_2$CHOHCH$_2$OH | red |
| 18 | " | " | " | " | H | —CH$_2$CH$_2$CN | H | " |
| 19 | " | —COOCH$_3$ | —C$_2$H$_5$ | H | H | —C$_2$H$_5$ | —CH$_2$CH$_2$C$_6$H$_5$ | scarlet |
| 20 | " | " | " | " | H | " | —CH$_2$C$_6$H$_5$ | " |
| 21 | " | —COOC$_2$H$_5$ | " | —NHCOCH$_3$ | H | —CH$_2$CH$_2$Cl | —CH$_2$CH$_2$Cl | red |
| 22 | " | " | —CH$_3$ | " | H | —CH$_2$CH$_2$Br | —CH$_2$CH$_2$Br | " |
| 23 | " | " | " | —CH$_3$ | H | —CH$_2$CH$_2$CN | —CH$_2$CH$_2$CN | scarlet |
| 24 | " | —COOC$_2$H$_5$ | —CH$_3$ | —NHCOCH$_3$ | H | —CH$_2$CH$_2$OC$_2$H$_5$ | —CH$_2$CH$_2$OC$_2$H$_5$ | red |
| 25 | —CH$_3$ | —CN | " | H | H | —CH$_2$CH$_2$OC$_2$H$_5$ | —CH$_2$CH$_2$OC$_2$H$_5$ | scarlet |
| 26 | —C$_2$H$_5$ | " | " | " | H | —C$_2$H$_5$ | —CH—C$_6$H$_5$<br>    |<br>    CH$_3$ | " |
| 27 | " | " | —C$_2$H$_5$ | —NHCOCH$_3$ | H | " | | " |
| 28 | " | " | " | —NHCOCH$_3$ | H | " | —C$_2$H$_5$ | red |
| 28 | " | " | —CH$_3$ | —NHCOCH$_3$ | H | " | " | " |
| 29 | " | " | " | —NHCOC$_2$H$_5$ | H | " | | " |

TABLE-continued

| Ex. No. | R₁ | R₂ | R₃ | R₄ | R₅ | R₆ | R₇ | Shade on polyester fibre material |
|---|---|---|---|---|---|---|---|---|
| 30 | | | | —NHCOCH₂CH₂Cl | H | " | " | " |
| 31 | —CH₃ | " | " | —NHCOOCH₂CH₂OC₂H₅ | H | " | " | " |
| 32 | " | " | " | —NHCOCH₃ | H | " | " | " |
| 33 | " | " | " | " | H | —CH₂CH₂CN | —CH₂CH₂OH | scarlet |
| 34 | " | " | " | H | H | " | H | " |
| 35 | " | " | " | H | H | —C₂H₅ | —C₂H₅ | " |
| 36 | " | " | " | " | H | " | —CH₂CH₂CN | " |
| 37 | " | " | " | " | H | —CH₂CH₂CN | " | " |
| 38 | CH₃ | CN | C₆H₅ | —CH₃ | H | —CH₂CH₂CN | " | scarlet |
| 39 | " | " | " | —CH₃ | H | —CH₂CH₂OCOCH₃ | —CH₂—CH₂OCOCH₃ | " |
| 40 | " | " | " | H | —OC₂H₅ | " | —CH₂—CH₂OCOCH₃ | " |
| 41 | " | " | " | —NHCOCH₃ | H | —C₂H₅ | —CH₂CH₂OC₆H₅ | red |
| 42 | " | " | " | H | H | —CH₂CH₂OCOCH₃ | —CH₂CH₂OCOCH₃ | scarlet |
| 43 | " | " | " | —NHCOC₂H₅ | H | —CH₂CH₂OCOCH₃ | —CH₂CH₂CN | red |
| 44 | " | " | " | H | H | —CH₂CH₂OH | H | scarlet |
| | | | | | | ![NO₂-phenyl] | | |
| 45 | " | " | " | —NHCOCH₃ | H | —C₂H₅ | —CH₂CH₂COOCH₃ | red |
| 46 | " | " | " | —NHCOC₂H₅ | H | —CH₂CH₂CN | —CH₂CH₂OCOC₂H₅ | " |
| 46a | " | " | " | " | H | —C₂H₅ | —CH₂CH₂COOC₂H₅ | " |

Following the procedure of Example 1 and employing appropriate starting materials, the following compounds, in which D is

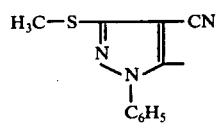

may be prepared.

| Example No. | | Shade |
|---|---|---|
| 47 | D—N=N—[decahydronaphthalenyl]—NHCH$_2$CH$_2$COOC$_4$H$_9$ | violet |
| 48 | D—N=N— (pyridinone with CH$_3$, CN, =O, OH, N-CH$_3$) | yellow |
| 49 | D—N=N— (pyridinone with CH$_3$, CN, =O, OH, N-C$_3$H$_7$) | " |
| 50 | D=N=N— (pyrazole with CH$_3$, HO, N-C$_6$H$_5$) | orange |
| 51 | D—N=N— (pyrazole with CH$_3$, H$_2$N, N-C$_6$H$_5$) | " |
| 52 | D—N=N—C$_6$H$_4$—N(C$_2$H$_5$)CH$_2$CH$_2$—N(CO—)(CO—)C$_6$H$_4$ | scarlet |
| 53 | D—N=N—C$_6$H$_4$—N(C$_2$H$_5$)CH$_2$CH$_2$—N(CO—)(SO$_2$—)C$_6$H$_4$ | " |
| 54 | D—N=N—C$_6$H$_4$—N(CH$_2$CH$_2$CN)CH$_2$CH$_2$—N(CO—CH$_2$)(CO—CH$_2$) | " |
| 55 | D—N=N—C$_6$H$_3$(NHCOCH$_3$)—N(CH$_2$CH$_2$COOCH$_3$)CH$_2$CH$_2$—N(CO—CH$_2$)(CO—CH$_2$) | red |

| Example No. | | Shade |
|---|---|---|
| 56 | 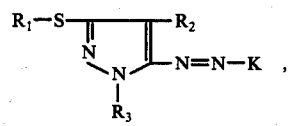 D—N=N—〈ring〉—N(CH₂CH₂)₂SO₂ | scarlet |
| 57 | D—N=N—〈ring〉—N(CH₂CH₂COOCH₂CH₂OC₂H₅)(CH₂CH₂CN) | " |
| 58 | 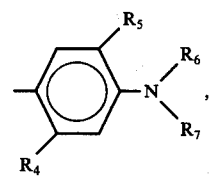 D—N=N—〈ring〉—N(C₂H₅)(CH₂CH₂SO₂C₂H₅) | " |

APPLICATION EXAMPLE

7 Parts of the dye produced according to Example 1, together with 4 parts dinaphthyl methane disulphonic acid (sodium salt) 4 parts sodium cetyl sulphate and 5 parts anhydrous sodium sulphate, are ground in a ball mill for 48 hours to give a fine powder.

1 Part of the dye preparation thus obtained is made into a paste with a little water, and the resultant suspension is passed through a sieve into a dyebath containing 3 parts sodium lauryl sulphate in 4000 parts water. The liquor ratio is 1:40. 100 Parts scoured polyester fibre material are then added to the bath at 40°–50°, followed by 20 parts of a chlorinated benzene, emulsified in water, the bath is heated slowly to 100° and dyeing is carried out for 1–2 hours at 95°–100°. The brilliant-red dyed fibres are washed, soaped, washed again and dried. The level dyeing obtained shows fastness to light, cross-dyeing, washing, water, sea water, perspiration, sublimation, flue gas, thermofixation, pleating and permanent pressing.

What is claimed is:

1. A monoazo dye of the formula

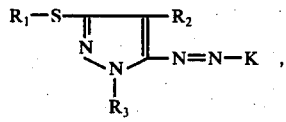

wherein
each of $R_1$ and $R_3$ is independently $C_{2-4}$alkenyl; $C_{1-4}$alkyl; $C_{1-4}$alkyl monosubstituted by hydroxy, cyano, $C_{1-4}$alkoxy, phenyl, phenoxy, chloro or bromo; phenyl or substituted phenyl having 1 to 3 substituents each of which is independently chloro, bromo, methyl, methoxy, ethoxy, cyano, nitro, methoxycarbonyl, ethoxycarbonyl, sulfamoyl, $C_{1-4}$alkylsulfamoyl or di-($C_{1-4}$alkyl)sulfamoyl, with the proviso that the maximum number of substituents selected from the group consisting of methoxy, ethoxy, cyano and nitro is two and the maximum number of substituents selected from the group consisting of methoxycarbonyl, ethoxycarbonyl, sulfamoyl, $C_{1-4}$alkylsulfamoyl and di-($C_{1-4}$alkyl)sulfamoyl is one,
$R_2$ is cyano or ($C_{1-4}$alkoxy)carbonyl, and
K is a coupling component radical of the N-alkylaminobenzene, N,N-dialkylaminobenzene, α-N-alkyl-aminonaphthalene, α-N,N-dialkylaminonaphthalene, pyrazolone, 5-aminopyrazole or 3-cyano-4-alkyl-6-hydroxypyridone-2 series.

2. A compound of the formula $$R_1-S-\underset{\underset{R_3}{|}}{N}\underset{N}{\overset{R_2}{\diagdown}}-N=N-K,$$

wherein
each of $R_1$ and $R_3$ is independently $C_{2-4}$alkenyl; $C_{1-4}$alkyl; $C_{1-4}$alkyl monosubstituted by hydroxy, cyano, $C_{1-4}$alkoxy, phenyl, phenoxy, chloro or bromo; phenyl or substituted phenyl having 1 to 3 substituents each of which is independently chloro, bromo, methyl, methoxy, ethoxy, cyano, nitro, methoxycarbonyl, ethoxycarbonyl, sulfamoyl, $C_{1-4}$alkylsulfamoyl or di-($C_{1-4}$alkyl)sulfamoyl, with the proviso that the maximum number of substituents selected from the group consisting of methoxy, ethoxy, cyano and nitro is two and the maximum number of substituents selected from the group consisting of methoxycarbonyl, ethoxycarbonyl, sulfamoyl, $C_{1-4}$alkylsulfamoyl and di-($C_{1-4}$alkyl)sulfamoyl is one,
$R_2$ is cyano or ($C_{1-4}$alkoxy)carbonyl, and
K is 4-N-β-($C_{1-4}$alkoxy)carbonylethylaminonaphthyl-1, 1-$C_{1-4}$alkyl-3-cyano-4-methyl-6-hydroxypyridon-2-yl-5, 1-phenyl-3-methylpyrazolon-5-yl-4, 1-phenyl-3-methyl-5-aminopyrazolyl-4 or

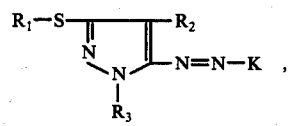

wherein
$R_4$ is hydrogen; chloro; bromo; cyano; $C_{1-2}$alkyl; formamido; ($C_{1-4}$alkyl)carbonylamino; ($C_{1-4}$alkyl)carbonylamino the $C_{1-4}$alkyl radical of which is monosubstituted by chloro, bromo, cyano, $C_{1-4}$alkoxy, phenyl or phenoxy; ($C_{1-4}$alkoxy)carbonylamino; ($C_{1-4}$alkoxy)carbonylamino the $C_{1-4}$alkoxy radical of which is monosubstituted by chloro, bromo, cyano, $C_{1-4}$alkoxy, phenyl or phenoxy; β-($C_{1-4}$alkoxy)ethoxycarbonylamino; β-($C_{1-4}$alkoxy)ethoxycarbonylamino the $C_{1-4}$alkoxy moiety of which is monosubstituted by chloro, bromo, cyano, $C_{1-4}$alkoxy, phenyl or phenoxy; $C_{1-4}$alkylsulfonylamino or $C_{1-4}$alkylsulfonylamino the $C_{1-4}$alkyl radical of which is nonosubstituted by chloro, bromo, cyano, $C_{1-4}$alkoxy, phenyl or phenoxy, $R_5$ is hydrogen or $C_{1-4}$alkoxy, $R_6$ is $C_{2-4}$alkenyl; 4-nitrophenyl; $C_{1-4}$-alkyl or substituted $C_{1-4}$alkyl having 1 or 2 substituents each of which is independently chloro, bromo, cyano, hydroxy, $C_{1-4}$alkoxy, ($C_{1-4}$alkoxy)carbonyl, β-($C_{1-4}$alkoxy)ethoxycarbonyl, ($C_{1-4}$alkoxy)carbonyloxy or ($C_{1-4}$alkyl)carbonyloxy, with the proviso that when $R_6$ is disubstituted $C_{1-4}$alkyl, at least one of the substituents is hydroxy, $R_7$ is hydrogen; phenyl($C_{1-4}$alkyl); $C_{2-4}$-alkenyl; 4-nitrophenyl; $C_{1-4}$alkyl; substituted $C_{1-4}$alkyl having 1 or 2 substituents each of which is independently chloro, bromo, cyano, hydroxy, $C_{1-4}$-alkoxy, ($C_{1-4}$ alkoxy)carbonyl, β-($C_{1-4}$-alkoxy)ethoxycarbonyl, ($C_{1-4}$alkoxy)carbonyloxy or ($C_{1-4}$alkyl)carbonyloxy, with the proviso that when $R_7$ is disubstituted $C_{1-4}$alkyl, at least one of the substituents is hydroxy;

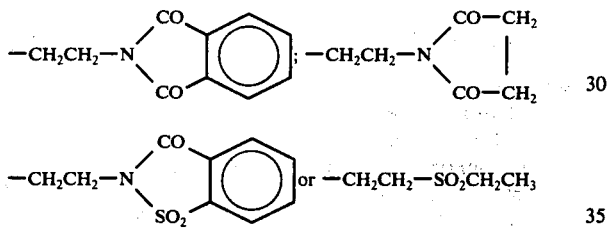

with the proviso that $R_6$ and $R_7$ are not simultaneously 4-nitrophenyl or t-butyl, or $R_6$ and $R_7$ taken together are —CH$_2$CH$_2$SO$_2$CH$_2$CH$_2$—, with the proviso that any alkyl or alkoxy radical substituted by hydroxy, alkoxy, alkoxycarbonyloxy, phenoxy or alkylcarbonyloxy has more than one carbon atom and is not substituted in its α-position.

3. A compound according to claim 2 wherein K is 4-N-β-($C_{1-4}$alkoxy)carbonylethylaminonaphthyl-1.

4. A compound according to claim 2 wherein K is 1-$C_{1-4}$alkyl-3-cyano-4-methyl-6-hydroxypyridon-2-yl-5.

5. A compound according to claim 2 wherein K is 1-phenyl-3-methylpyrazolon-5-yl-4.

6. A compound according to claim 2 wherein K is 1-phenyl-3-methyl-5-aminopyrazolyl-4.

7. A compound according to claim 2 wherein K is

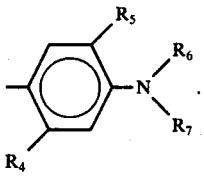

8. A compound according to claim 7 wherein
$R_4$ is acetamido, propionamido, methoxycarbonylamino, ethoxycarbonylamino, β-methoxyethoxycarbonylamino or β-ethoxyethoxycarbonylamino, $R_5$ is hydrogen or ethoxy, and each of $R_6$ and $R_7$ is independently ethyl or ethyl mono-substituted by cyano, hydroxy, methoxy, ethoxy, acetoxy, propionyloxy, methoxycarbonyl or ethoxycarbonyl.

9. A compound according to claim 8 wherein
$R_1$ is methyl, ethyl or phenyl,
$R_2$ is cyano, methoxycarbonyl or ethoxycarbonyl, and
$R_3$ is methyl or phenyl.

10. A compound according to claim 2 wherein
$R_1$ is $C_{1-4}$alkyl or phenyl,
$R_2$ is cyano or ($C_{1-4}$alkoxy)carbonyl, and
$R_3$ is methyl, phenyl or substituted phenyl having 1 or 2 substituents each of which is independently chloro, bromo, methyl or methoxy.

11. A compound according to claim 10 wherein
$R_1$ is methyl, ethyl or phenyl,
$R_2$ is cyano, methoxycarbonyl or ethoxycarbonyl, and
$R_3$ is methyl or phenyl.

12. A compound according to claim 11 having the formula

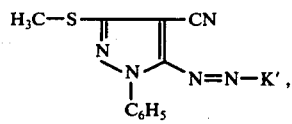

wherein K' is

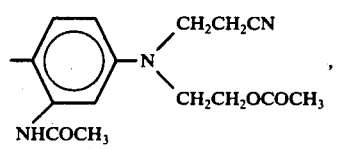

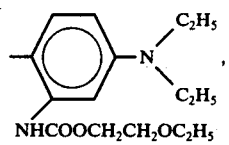

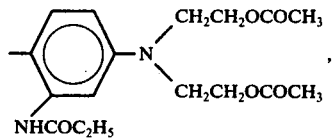

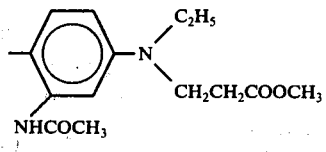

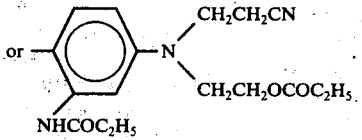

13. The compound according to claim 12 having the formula

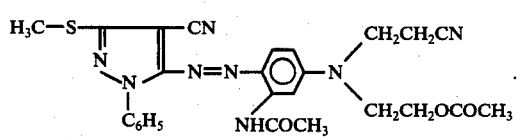
14. The compound according to claim 12 having the formula
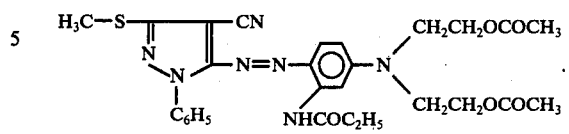
* * * * *